United States Patent [19]

August et al.

[11] 4,434,667
[45] Mar. 6, 1984

[54] PERMANENT MAGNET FLOWMETER HAVING IMPROVED OUTPUT TERMINAL MEANS

[75] Inventors: Charles August, Darien; Harry J. Myers, Downers Grove, both of Ill.

[73] Assignee: The United States of America as represented by the United States Department of Energy, Washington, D.C.

[21] Appl. No.: 314,917

[22] Filed: Oct. 26, 1981

[51] Int. Cl.³ .............................................. G01F 1/58
[52] U.S. Cl. .............................. 73/861.12; 73/861.13; 376/246
[58] Field of Search ..................... 73/861.12, 861.13; 376/246; 310/11

[56] References Cited

U.S. PATENT DOCUMENTS 3,608,375  9/1971  Cushing .......................... 73/861.12
4,008,609  2/1977  Lambrecht et al. ............ 73/861.13

Primary Examiner—James J. Gill
Assistant Examiner—John E. Chapman, Jr.
Attorney, Agent, or Firm—Bruce R. Mansfield; Paul A. Gottlieb; Richard G. Besha

[57] ABSTRACT

Disclosed is an improved permanent magnet flowmeter capable of withstanding bending stresses in the direction of induced emf signals. The flowmeter includes a unique terminal arrangement integrally formed with the flowmeter by trepanning opposing wall sections of the flowmeter body. The terminal arrangement provides increased flowmeter sensitivity by increasing the strength of the induced emf signals.

6 Claims, 5 Drawing Figures

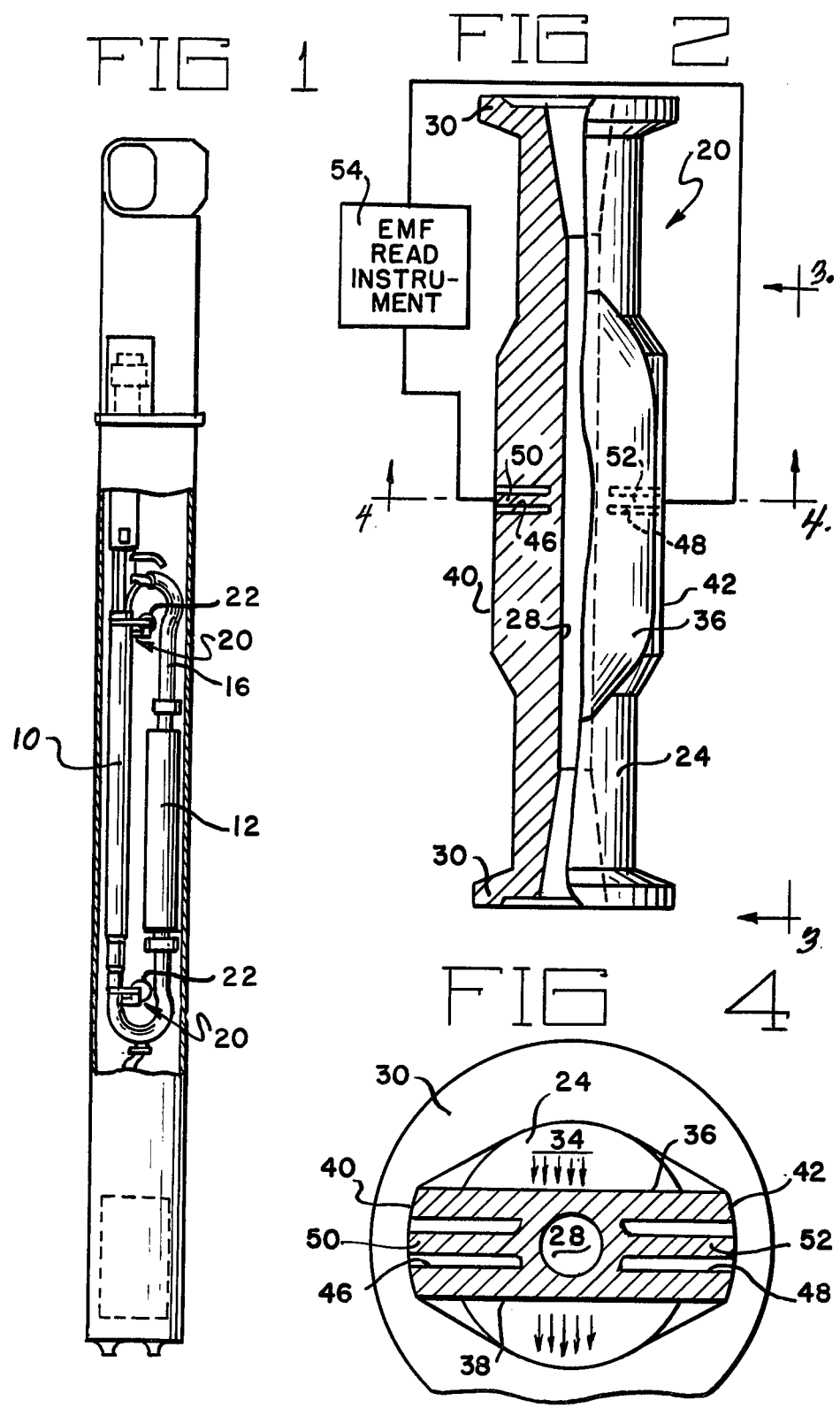

PERMANENT MAGNET FLOWMETER HAVING IMPROVED OUTPUT TERMINAL MEANS

CONTRACTUAL ORIGIN OF THE INVENTION

The U.S. Government has rights in this invention pursuant to Contract No. W-31-109-Eng-38 between the U.S. Department of Energy and Argonne National Laboratory.

BACKGROUND OF THE INVENTION

This invention pertains to flowmeters of the electromagnetic type and in particular to high pressure electromagnetic flowmeters of the permanent magnet type. Such flowmeters include an electrically conductive duct for containing the flow of a conductive medium to be monitored. The duct is surrounded by a permanent magnet which creates a magnetic field perpendicular to the axis of the duct. The duct is formed of non-magnetic material so as not to distort the magnetic field which passes through the interior of the duct and the flowing conductive medium contained therein. As a conductive medium, such as liquid metal, is passed through the duct, an electromotive force (emf) is set up in a direction perpendicular to both the axis of the duct (i.e. the direction of medium flow) and the direction of the magnetic field passing through the flowing medium. The emf generated is proportional to the volumetric flow rate of the conductive medium as long as the velocity profile of the flow is axially symmetrical.

Frequently, such flowmeters must be installed in conduit sections subjected to great mechanical stress. One example of such stress occurs in a closed flow loop having a large temperature gradient throughout its length, i.e. an arrangement in which one section of the loop is operated at a much higher temperature than other sections. Depending primarily on the temperature difference in the loop and the type of materials used, large bending moments can be experienced in the cooler portions of the loop. Cooler portions of the loop are more suitable for electrical connections to the flowmeter location. Due to the mechanical stresses involved, the mass of the flowmeter must be significantly increased for greater mechanical strength in the direction of stress. However, if the increased mass must be located in the path of the induced emf output, significant reductions in the magnitude of the output signal, as well as the sensitivity of the flowmeter, result. Further complications arise if the flow loop is operated at high pressures, or if the flow loop contains a hazardous material which cannot be allowed to escape. In such cases, structural integrity of the flowmeter duct must be preserved so as to avoid the risk of hazardous material leakage.

One example of a flowmeter containing a hazardous material is found in a nuclear test reactor for testing fuel element containers which are cooled by liquid sodium. Such arrangements must provide fail-safe containment of the potentially radioactive coolant which contacts fuel element containers being tested for structural integrity under simulated operating conditions. Flowmeters placed in paths of coolant flow must not degrade the containment properties of the test reactor. Such degradation is particularly compromised when a sensitive flowmeter is subjected to the mechanical stresses of closed-loop liquid sodium systems.

It is therefore an object of the present invention to provide a magnetic flowmeter having increased sensitivity, which is capable of withstanding mechanical stress in a given direction, particularly the direction of induced emf.

It is another object of the present invention to provide an improved flowmeter of the above-described type having improved structural integrity providing an effective containment of high temperature, high pressure hazardous materials.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

These and other objects of the present invention are provided by a magnetic flowmeter having a nonmagnetic, electrically conductive duct for containing a flowing potentially hazardous conductive medium. A permanent magnet having diametrically opposed pole pieces surrounds the duct to introduce therein a magnetic field extending generally perpendicular to the axis of the duct. The duct wall has a greatly increased thickness in the direction of induced emf, as compared to the wall thickness in the direction of the magnetic field. Channels extending in the direction of induced emf, perpendicular to both the duct axis and the magnetic field, are formed in the thickened duct wall by trepanning or the like machining method. The trepanned channel extends toward the center of the duct to form post-like terminal sections which provide connection of instruments which sense the induced emf output of the flowmeter. The channels may be filled with an electrically insulating material to further increase the strength of the flowmeter duct.

BRIEF DESCRIPTION OF THE DRAWINGS

FIG. 1 is an elevational view of a reactor test assembly incorporating the flowmeter according to the invention.

FIG. 2 is an elevational view of the flowmeter according to the invention.

FIG. 4 is a cross sectional view of the flowmeter taken along the lines 4—4 of FIG. 2.

DETAILED DESCRIPTION OF THE PREFERRED EMBODIMENT

Figure 3:
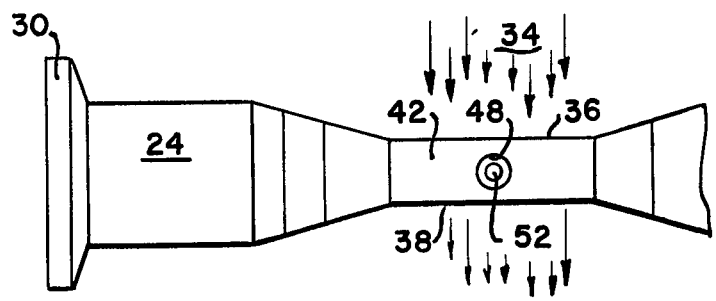
FIG. 3 is an elevational view of the flowmeter shown at right angles to the view of FIG. 2.

Referring now to the drawings, and especially to FIG. 1, an assembly for testing reactor fuel elements in an operating nuclear reactor environment is shown. Fuel elements are located in chamber 10 through which a liquid sodium coolant is circulated by an annular linear induction pump 12. Chamber 10 and pump 12 form portions of a closed sodium flow loop 16, through which liquid sodium is circulated at a pressure of 5000 psi. Although chamber 10 is designed to contain the nuclear fuel elements being tested, it is possible that some particles of fuel or fuel products could penetrate the chamber so as to be introduced into the sodium coolant of flow loop 16. Accordingly, the molten sodium coolant is considered to be a potentially hazardous material requiring an integral containment structure. In operation, the portion of the flow loop containing pump 12 is maintained at temperature of 1000° F. about 300°–400° F. hotter than the portion of the loop containing chamber 10. Severe stresses in loop 16 adjacent chamber 10 are created by the temperature gradient and resulting unequal expansion of closed loop 16. Inlet and outlet flowmeters 20 constructed according to the invention are located in the stressed area of flow loop 16 adjacent chamber 10. Permanent magnets 22 are located adjacent the flowmeters. Flowmeters 20 measure the flow of molten sodium through chamber 10, which flow cools the fuel elements contained therein.

Referring now to FIGS. 2–4, and in particular to FIG. 2, flowmeter 20 comprises a duct 24 formed of a non-magnetic material, preferably stainless steel. A cylindrical passageway 28 for the molten sodium is formed in duct 24. Passageway 28 is enlarged at each end to provide a smooth transition to the remainder of flow loop 16. The size and length of passageway 28, are conventionally designed to provide a pressure drop across the flowmeter. End portions 30 provide connection of the flowmeter to the remainder of flow loop 16.

Referring now to FIGS. 3 and 4, arrows 34 indicate the direction of magnetic flux created by the permanent magnet 22 of FIG. 1, not shown in FIGS. 2–4. As can be seen most clearly in FIG. 4, the cross-sectional configuration of duct 24 is non-symmetrical, being elongated in the portion between opposed faces 40, 42, relative to the portion between opposed faces 36, 38. The width of the wall portions extending in the direction of arrows 34, (i.e. between surfaces 36, 38) is designed to adequately withstand the high pressure sodium flow. As can be seen in FIG. 4, the wall thickness of duct 24 extending perpendicular to the direction of arrows 34, (between surfaces 40, 42) is greatly increased. This increased thickness or section modulus is required to withstand the bending moment created by the unequal expansion of flow loop 16. The emf induced in the flowmeter extends in the direction of increased wall thickness, i.e., between surfaces 40, 42. Compared to the thickness between surfaces 36, 38, the increased thickness between surfaces 40, 42, presents a longer path of electrically conductive material to the induced emf output signal. This increased output signal path would, if it were not for the present invention, seriously degrade the performance of the flowmeter, and the increased shunting effect of the conductive walls of duct 24 would reduce the magnitude of the induced emf appearing across the surfaces 40, 42. Cylindrical channels 46, 48 are formed in opposing wall sections of duct 24 to extend in a direction of induced emf. Channels 46 extend into duct 24 to a depth such that the remaining wall thickness between the bottom of the channels and passageway 28 is approximately the same as the thickness of the walls between surfaces 36, 38 and passageway 28. Channels 46, 48 are formed by any convenient method but preferably are formed by trepanning duct 24 to form right-circular cylindrical recesses. In the preferred embodiment, cylindrical posts 50, 52 formed by the trepanning operation, serve as terminal means for an external emf reading instrument 54 connected across surfaces 40, 42. In this manner, electrical insulation is provided along the path of induced emf, preventing shunting currents from reducing the flowmeter's output voltage signal. The structural integrity of the flowmeter necessary for confining the pressurized, potentially hazardous material is preserved without penetration of passageway 28. Further, posts 50, 52 provide a connection at the outer surfaces 40, 42 of the flowmeter, rather than requiring connection at the bottom of channels 46, 48. If necessary, channels 46, 48 can be filled with an insulating material to overcome any weakening caused by trepanning channels 50, 52.

Figure 5:
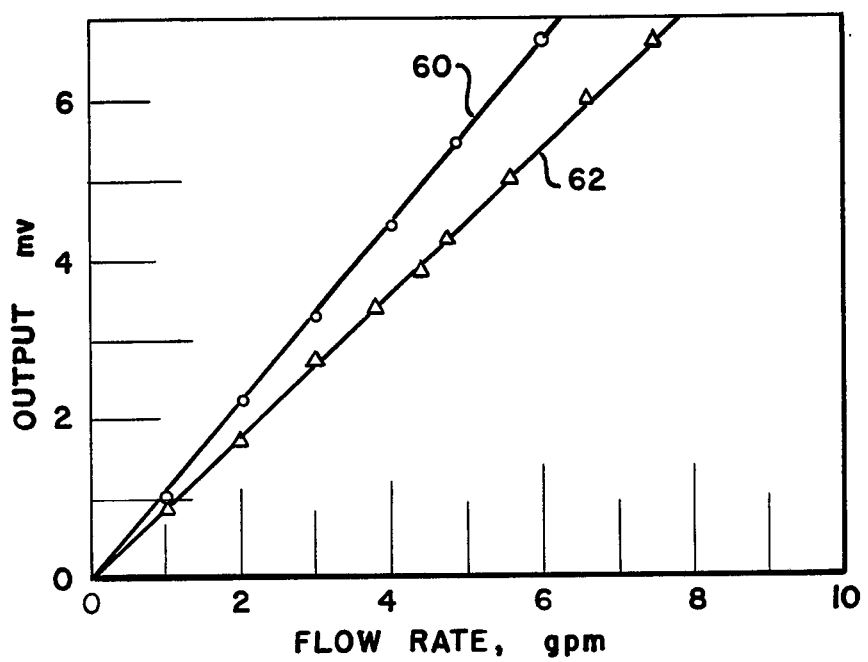
FIG. 5 is a graph indicating the improved performance of the flowmeter constructed according to the invention.

The flowmeter according to the invention was constructed for use in the TREAT Reactor located at Idaho Falls, Idaho. Two flowmeters were installed in the sodium loop of the reactor, which provides cooling for the fuel elements being tested. The sodium loop comprises a closed loop having a high temperature portion and a low temperature portion. The flow loop is operated at high pressure (5000 psi) and high temperature (up to 1000° F. in the high temperature portion). The temperature difference between high and low temperature portions of the flow loop range between 300° and 400° F. The flowmeter, constructed of 316 stainless steel, was capable of adequately containing the high liquid sodium while withstanding the bending forces due to the unequal rates of expansion of the flow loop. Improved performance of the flowmeter according to the invention can be seen with reference to the graph of FIG. 5. In that graph, flowmeter output signal strength in millivolts is plotted against flow rate expressed in gallons-per-minute. The flow loop temperature adjacent the chamber was held at 750° F., and the flow loop temperature adjacent the pump was maintained at 350° F. Two curves 60 and 62, shown in FIG. 5, indicate the respective performance of a flowmeter having terminals according to the invention, and a similar flowmeter having conventional terminal connections to the outside surface of the flowmeter body, respectively. Increases in flowmeter sensitivity ranging from 15% to 20% have been realized by the present invention.

It will be appreciated that the flowmeter according to the invention offers an improved integral construction which is particularly advantageous for reliable confinement of the potentially radioactive sodium coolant. Thus, it can be seen that the flowmeter of the invention offers advantages for those flowmeters which, because of space limitations or the like, cannot accommodate magnetic pole pieces oriented in a direction of increased wall thickness.

The embodiments of the invention in which an exclusive property or privilege is claimed are defined as follows:

1. A magnetic flowmeter for measuring flow of a high temperature, high pressure potentially hazardous electrically conductive medium therethrough, comprising:
an elongated body of nonmagnetic material having a longitudinal passageway extending therethrough, said body defining a wall surrounding said passageway for containing a longitudinal flow of conductive medium therein, said wall having a first thickness extending in a first direction perpendicular to the direction of flow of the medium, said wall further having a second substantially greater thickness extending in a second direction perpendicular to both the direction of flow of the medium and said first direction;
magnetic means for passing a magnetic field through said passageway in said first direction; and
elongated terminal means extending in said second direction and integrally formed with said wall of said body, said terminal means formed by trepanning said wall in said second direction to form an inwardly extending cylindrical channel having a bottom, the bottom of said channel spaced from said passageway by a distance approximately equal to said first thickness whereby an electromotive force, generated in said flowing medium and proportional to the rate of flow of said medium through said flowmeter, is transmitted through said terminal means.

2. The invention of claim 1 wherein said conductive medium comprises liquid metal.

3. The invention of claim 2 further including an endless coolant loop of a nuclear reactor for containing a flow of liquid metal, said coolant loop connected in flowing communication with said passageway of said flowmeter.

4. The invention of claim 3 wherein said coolant loop has a first thermally stressed portion in which said flowmeter is located and a second hotter portion.

5. The invention of claim 4 wherein said liquid metal comprises molten sodium.

6. The invention of claim 5 wherein said nonmagnetic material comprises stainless steel.

* * * * *